Feb. 13, 1940. C. A. TOCE ET AL 2,190,555
PARKING METER EXPANSION CLAMP
Filed Aug. 16, 1937
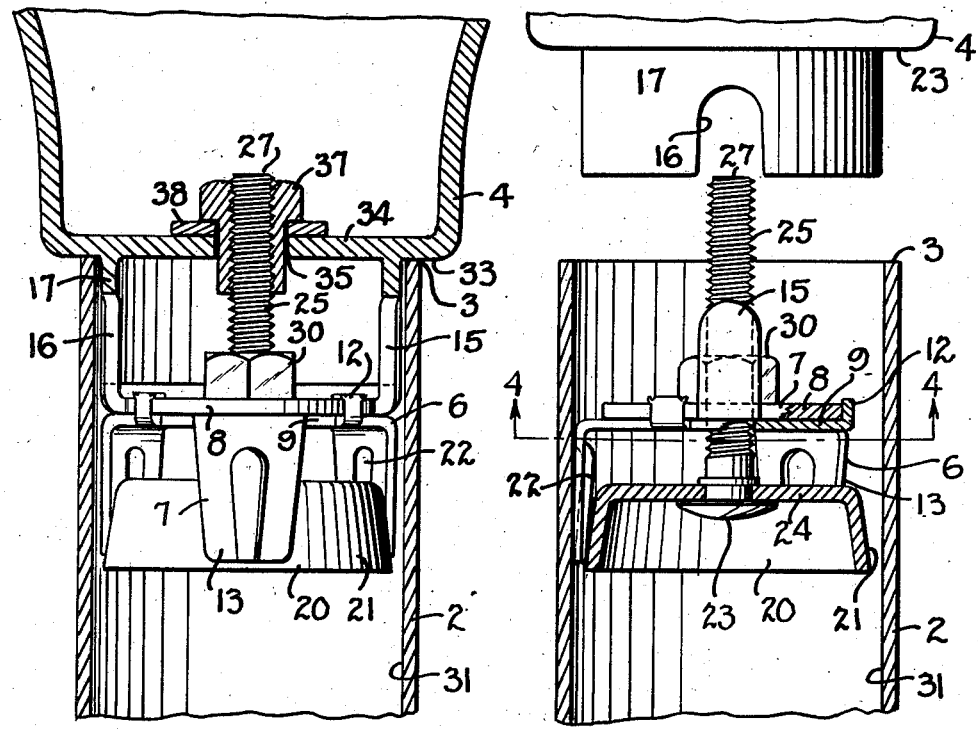
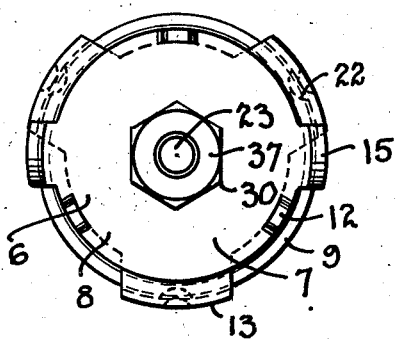
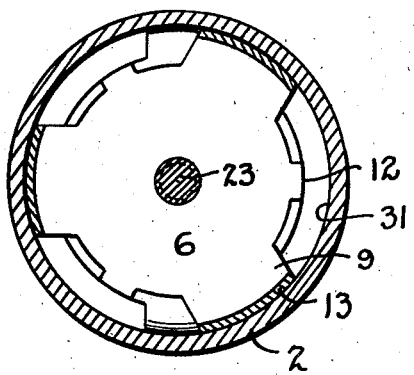
Inventor
CHAS. A. TOCE
ROBT. F. BROUSSARD.
WM. N. WOODRUFF.
By  Jesse R. Stone
Lester B. Clark
Attorneys.

Patented Feb. 13, 1940

2,190,555

UNITED STATES PATENT OFFICE 2,190,555

PARKING METER EXPANSION CLAMP

Charles A. Toce, Robert F. Broussard, and William N. Woodruff, Houston, Tex., assignors, by mesne assignments, to Vehicular Parking, Ltd., Washington, D. C., a corporation of Delaware Application August 16, 1937, Serial No. 159,353

3 Claims. (Cl. 287—20)

The invention relates to an expansible clamp which is particularly adapted for use in combination with a parking meter and its support post.

It is the usual practice to position a hollow pipe or support post at a location adjacent the curbstone where a parking meter is to be situated. This post is securely anchored in the earth and has a height of several feet. It is desirable to detachably secure the parking meter to this post because in some instances the meter needs to be removed for repair or replacement, whereas the post is a permanent fixture. Meters of this type must be securely anchored so that they cannot be removed by some unauthorized person, and it is one of the objects of the present invention, therefore, to provide a clamp which is completely enclosed in the pipe and the parking meter so that it cannot be loosened or removed except by an authorized person who has access to the inside of the parking meter.

It is one of the objects of the invention to provide a clamp which can be securely anchored within a hollow pipe and may thereafter receive a parking meter and have the parking meter securely anchored to the clamp.

Another object of the invention is to provide a clamp which can be expanded inside of the end of the hollow pipe so that it will be securely fixed in position.

Still another object of the invention is to provide a clamp which can be anchored in position and to which another object may be thereafter securely attached.

Another object of the invention is to provide an expansible clamp which will receive an object to be anchored and to which the object will be held in a non-rotatable position.

A still further object of the invention is to provide a parking meter clamp which may be anchored in the support post in such a position that the parking meter can be attached thereto and drawn down into close contact with the top of the post and held by the clamp in a non-rotatable position.

Other and further objects of the invention will be readily apparent when the following description is considered in connection with the accompanying drawing, in which:

Fig. 1 is a vertical sectional view of some of the parts in elevation and illustrating the clamp in anchored position in the pipe and with the parking meter about to be attached thereto.

Fig. 2 is a section similar to Fig. 1 but showing the parking meter in anchored position.

Fig. 3 is a top plan view of the clamp.

Fig. 4 is a section taken on the line 4—4 of Fig. 1 and looking in the direction of the arrows to illustrate the interfitting arrangement of the parts.

Parking meters of the general type to be affixed in the position by this construction are illustrated in the patent to Woodruff et al. 2,162,191, granted June 13, 1939.

In Fig. 1 the pipe or support post 2 is affixed in the earth in a rigid position so that it extends upwardly to the desired elevation and terminates in a flat or smooth upper end 3. The parking meter 4 must be affixed securely in position and to accomplish this the clamp 6 has been provided.

This clamp is made up of a frame 7 which is in turn made up of a body 8 and a skirt portion 9. The body 8 and skirt 9 are held together in fixed relationship by virtue of the tongue pieces 12 which are formed on the skirt 9 and bent upwardly and around the body 8 to be clamped in position as best seen in Fig. 2 and in this manner the body and skirt are secured together with the fingers 13 on the skirt extending downwardly therefrom. Any desired number of these fingers may be provided, three having been illustrated in the drawing. The body 8 has a pair of upstanding lugs 15 thereon which are arranged to be received within the slots 16 in the lower portion 17 of the parking meter 4 so that there can be no relative rotation between the anchor clamp and the parking meter.

In order that the clamp may be secured in the post or pipe 2 an expander cup or cone 20 has been positioned inside of the fingers 13 and has an outwardly inclined tapered face 21 thereon, which is arranged to abut the inside face 22 of the fingers 13. To facilitate a friction grip, each of the fingers has been deformed to provide the contact surface 22 which abuts against the periphery of the cone 20.

In order that the expander and the fingers may be drawn together a bolt 23 has been fixed in the web 24 of the expander and has the threaded portion 25 thereof extending upwardly through the skirt 9 and the body 8, an opening having been provided through both of these parts so that they are slidable along the bolt.

As seen in Fig. 1, this assembly with the frame and skirt passed over the bolt will be inserted in the upper end of the pipe 2 and adjusted to the desired elevation, preferably such that the upper end 27 of the bolt extends above the end 3 of the pipe. With the parts in this position the nut 30 will be screwed downwardly on the bolt so as to draw the expander cup 20 into the fingers 13 to cause their expansion against the inner periphery 31 of the pipe 2. This nut 30 may be turned any desired amount to securely position the clamp in expanded position inside of the pipe.

After the clamp has been secured in this manner the parking meter 4 is then lowered over the bolt as seen in Fig. 1 and moved down so that the shoulder 33 thereof abuts against the upper end 3 of the pipe and the slots 16 are passed over the lugs 15 so that the parking meter is thereafter held against rotation. The web 34 of the bottom of the parking meter is provided with an opening 35, through which bolt 25 will pass and a locking nut 37 can then be screwed onto the bolt so that it will abut against a washer 38 and in this manner the parking meter is drawn securely against the upper end of the pipe 3 so that it will thereafter be immovable.

Of course it is understood that parking meters of this type have a small door therein by which access is had to the interior of the meter and this door carries a suitable lock so as to prevent the entry of unauthorized persons. It is through this doorway that the nut 37 can be tightened so that so long as the door is locked there can be no access to the meters. It is intended that the clamp will be securely clamped and anchored in position so that it cannot be removed or tampered with, but the parking meter may be removed for repair or replaced without removing the clamp.

What is claimed is:

1. A parking meter expansion clamp adapted to be positioned within a tubular post, comprising in combination, an expansion cup, a bolt extending upwardly therefrom, a skirt slidable on said bolt having depending fingers extending over said cup and upstanding lugs to lie within the tubular post and adapted to engage a parking meter housing, a nut on said bolt to draw said skirt and cup together to effect expansion of said fingers, and an anchor nut to clamp said parking meter housing upon said lugs to hold it securely in position and against rotational movement.

2. In apparatus of the character described, the combination of a hollow parking meter support post; a parking meter housing; and a clamp maintaining said meter housing on said post, such clamp having means to affix said meter housing thereto so that said meter housing may be attached to or removed from the post, and means to expand on the inside of said post to anchor said clamp to the post with a portion of the clamp interlocking with said meter housing to prevent turning of the same.

3. In apparatus of the character described, in combination, a parking meter housing including a base portion and a shoulder thereon; a support pipe having an end to receive said base internally thereof and abutting said shoulder; and a clamp, said clamp including means to anchor it within the pipe, means to interlock with said internally extending base portion so that said meter is held against rotation, and means maintaining the shoulder of said meter housing against said pipe in abutting relation.

CHARLES A. TOCE.
ROBERT F. BROUSSARD.
WILLIAM N. WOODRUFF.